US005573146A

United States Patent [19]

Gardner

[11] Patent Number: 5,573,146

[45] Date of Patent: Nov. 12, 1996

[54] ADJUSTABLE PNEUMATIC LIFT DEVICE FOR DUAL FLOW VALVE

[75] Inventor: Richard K. Gardner, Montpelier, Ohio

[73] Assignee: Ingersoll-Rand Company, Woodcliff Lake, N.J.

[21] Appl. No.: 370,078

[22] Filed: Jan. 9, 1995

[51] Int. Cl.[6] .................................................. G01F 11/06

[52] U.S. Cl. .......................... 222/309; 222/388; 222/389; 222/485; 222/504; 222/509; 222/518

[58] Field of Search .................................. 222/309, 388, 222/389, 504, 509, 518, 483, 484, 485

[56] References Cited

U.S. PATENT DOCUMENTS

| | | | |
|---|---|---|---|
| 4,293,010 | 10/1981 | Winiasz | 222/309 X |
| 4,801,051 | 1/1989 | Lewis et al. | 222/309 |
| 4,852,773 | 8/1989 | Standlick et al. | 222/504 |
| 5,022,556 | 6/1991 | Dency et al. | 222/309 X |
| 5,205,439 | 4/1993 | Sturm | 222/504 X |
| 5,277,344 | 1/1994 | Jenkins | 222/504 |

*Primary Examiner*—Joseph Kaufman

*Attorney, Agent, or Firm*—Walter C. Vliet

[57] ABSTRACT

Positive adjustable flow is provided for a dual flow valve for paint dispensing or the like utilizing externally adjustable stops and operating lifts deployed by a single pressure source alternatively or simultaneously applied to a plurality of operating pistons.

6 Claims, 1 Drawing Sheet

ADJUSTABLE PNEUMATIC LIFT DEVICE FOR DUAL FLOW VALVE

BACKGROUND OF THE INVENTION

This invention relates generally to flow control devices and more particularly to a lift mechanism for a dual flow paint dispensing valve. Dual flow valves usually consist of a valve with two orifices. The flow is controlled by the amount the valve is opened. A force lifting the valve stem a short distance allows low flow, increasing the lift distance opens the high flow. The valves are generally held in the closed position by a spring, thus the farther open the valve the more force is required. When a pneumatic cylinder is the lifting device the amount the valve is opened is controlled by the amount of air pressure. Precisely controlling the air pressure is difficult and hence the precision flow control of the valve is limited to the extent the air pressure may be controlled.

The foregoing illustrates limitations known to exist in present devices and methods. Thus, it is apparent that it would be advantageous to provide an alternative directed. to overcoming one or more of the limitations set forth above. Accordingly, a suitable alternative is provided including features more fully disclosed hereinafter.

SUMMARY OF THE INVENTION

In one aspect of the present invention this is accomplished by providing an adjustable lift pneumatic device for dual flow valve comprising a reciprocating flow control stem operatively connected to a first piston reciprocating in a cylinder between defined limits of a forward stop and a rearward stop; a movable stop operatively connected to a second piston reciprocating in a second cylinder between defined limits of a forward position and a rearward position; and a movable stop when reciprocated to the forward position redefines the limit of the rearward stop.

The foregoing and other aspects will become apparent from the following detailed description of the invention when considered in conjunction with the accompanying drawing figures.

BRIEF DESCRIPTION OF THE DRAWING FIGURES

FIG. 1 is a longitudinal cross section illustrating an embodiment of the present invention.

DETAILED DESCRIPTION

Figure 1:
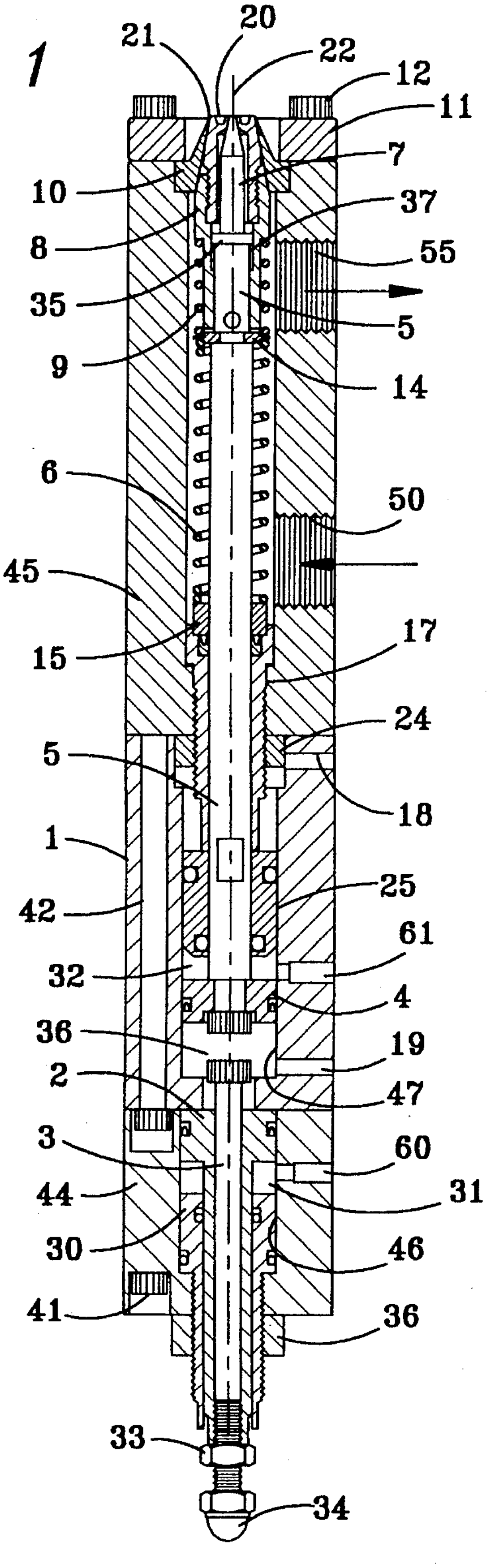

Referring to FIG. 1 a dual flow dispensing valve for paint, ink, or the like is shown. Incorporated in the valve is an improved pneumatic lifting device which allows flow adjustment for low and high flow without changing air pressure. This is desirable when several valves are being used as it simplifies connections and does not require a regulator for each valve. Repeatable flow and flow pattern may be accomplished since both the high and low flow lifts have adjustable positive stops. Manufacture and assembly are also simplified since the adjustable stops may be assembled separately and added without alignment problems. Servicing and trouble shooting is also improved. The amount each tip opens can be determined by the number of turns each adjustment screw is opened.

The valve and its adjustable lifting device is contained in three major body parts. A cylinder 1 which contains the pneumatic actuation portion of the valve, a head 44 portion containing a pneumatically deployed stop and a fluid dispensing base housing 45 into which is introduced a pressurized paint or ink supply which is further distributed on valve actuation through a high and low flow orifice. Each of the three major components is generally constructed of a rectangular cross section housing having an axially aligned bore running through it in axial alignment with its corresponding component. The entire assembly is bolted together by means of bolts as will now be more particularly described.

The head 44 is provided with a circular bore 46. A piston guide and chamber seal 30 is inserted in the bore 46 and positioned therein by means of a threaded engagement and stop nut 36. A stop piston 2 is inserted in the bore 46 for reciprocation therein and an extended stem 5 of the piston cooperates with the piston guide 30. A low flow stop screw 3 extends through the stop piston 2 and the extended stem of the piston. The low stop screw 3 extends into cylinder 1 and extends externally of the head 44. Screw 3 is threadingly engaged with the stop piston 2 at the externally exposed end. Its position relative to the stop piston is retained by means of a stop nut 33 once the appropriate relative position is established by means of rotating cap nut 34 and hence the low stop screw 3. A low flow chamber 31 is formed between the stop piston 2 and the piston guide and chamber seal 30.

Air enters the low flow chamber 31 by means of a low flow air supply port 60. As will be appreciated by one skilled in the art, pressure air supplied to the port 60 will force the stop piston 2 upward and hence deploy the low stop screw into the cylinder 1 area. Removal of the air supply at port 60 will allow the piston 2 to return.

The cylinder 1 is provided with a bore 47 having a stem piston 4 reciprocally disposed within it. Also disposed within the bore 47 is a piston chamber seal 25 which forms a high flow chamber 32 between the piston seal 25 and the stem piston 4. A stem 5 is attached to the piston 4 and extends in reciprocating sliding contact through the piston seat and chamber seal 25.

The piston seat 25 is positioned within the bore 47 by means of a guide 17 which is threadingly engaged with the fluid handling base 45 and secured there by means of a stop nut 24. The chamber formed between the fluid base 45 and the piston seat 25 is vented by means of a bleed vent 18. Pressurized air supplied to port 61 enters the chamber 32 formed between the piston 4 and the piston seat 25.

When the chamber 32 is pressurized, the piston 4 is forced downward, as shown in FIG. 1, thus drawing with it the stem 5. Movement of the stem 5 compresses stem spring 6 between a stop 15 and a spring stop 14. Upon release of air pressure in port 61, the stem spring 6 returns the stem upward as shown in FIG. 1.

When the stem 5 moves down it withdraws tip 7 from the low flow orifice 22 thereby permitting paint or the like supplied at port 50 to be dispensed through slots (not shown) in tip holder 8 of the orifice tip 20. Spring 9 acting against spring stop 14 urges the tip holder 8 and hence the orifice tip 20 to remain in contact with the high flow orifice seat 10. The spring 9 will hold the orifice tip in place until the "lost motion" stop 35 contacts the tip holder 8. Further motion will then withdraw the orifice tip 20 allowing a high flow of paint or the like to pass through the high flow orifice 21.

Deployment of the low flow stop as previously described by pressurizing air supply port 60 limits the stem motion to that which may be absorbed in the lost motion permitted before the lost motion stop 35 hits the tip holder 8. Removal of the air supply from port 60 permits the stop screw to be retracted into the head 44 thereby permitting the stem piston 4 to be further deployed (by means of air pressure in air supply port 61) past the lost motion limit provided by the lost motion stop 35 and hence thereby permits the withdrawal of the tip holder and orifice tip 20 from seat 10 to permit high flow.

A paint return port 55 permits a constant flow of paint to the paint dispensing valve and also provides a means for circulating cleaning fluid through the valve when required. Assembly of the head 44 to the cylinder 1 is accomplished by means of head bolts 42 and the cylinder 1 is attached to the fluid housing base 45 by means of cylinder bolts 41. A retainer for the orifice seat 10 is attached to the base 45 by means of retainer bolts 12.

A square cross section of the valve has been found to provide a convenient shape for stacking the valve, however, a circular cross section is also convenient.

Having described my invention in terms of a lift mechanism for a paint dispensing valve, numerous alternatives will occur to one skilled in the art. I do not wish to be limited in the scope of my invention except as claimed.

What is claimed is:

1. An adjustable lift device for a dual orifice dual flow valve comprising:

a reciprocating flow control stem operatively connected to a first piston reciprocating in a cylinder between defined limits of a forward stop and a rearward stop;

a movable stop operatively connected to a second piston reciprocating in a second cylinder between defined limits of a forward position and a rearward position;

said movable stop being reciprocated to said forward position redefines the limit of said rearward stop;

said reciprocating flow control stem directly operates a low flow orifice; and lost motion means deployed between said reciprocating flow control stem and a high flow orifice for accumulating a difference in motion for deployment of a low flow orifice and a high flow orifice dispensing means.

2. An adjustable lift device for a dual orifice dual flow valve according to claim 1 wherein:

said rearward stop and said rearward position are externally adjustable.

3. An adjustable lift device for a dual orifice dual flow valve according to claim 1 wherein:

said first piston and said second piston are pneumatically deployed and said rearward stop is deployed with said second piston.

4. An adjustable lift device for a dual orifice dual flow valve according to claim 1 wherein: said dual flow valve is a paint dispensing valve.

5. An adjustable lift device for a dual orifice dual flow valve according to claim 1 wherein:

said dual flow valve is an ink dispensing valve.

6. An adjustable lift device for a dual orifice dual flow valve for dispensing paint, comprising:

a reciprocating flow control stem operatively connected to a first piston reciprocating in a cylinder between defined limits of a forward stop and a rearward stop;

a movable stop operatively connected to a second piston reciprocating in a second cylinder between defined limits of a forward position and a rearward position;

said movable stop when reciprocated to said forward position redefines the limits of said rearward stop;

lost motion means deployed between said reciprocating flow control stem and a high flow orifice for accumulating a difference in motion for deployment of a low flow orifice and a high flow orifice dispensing means; and said reciprocating flow control stem directly Operates a low flow orifice.

* * * * *